Patented Sept. 16, 1941

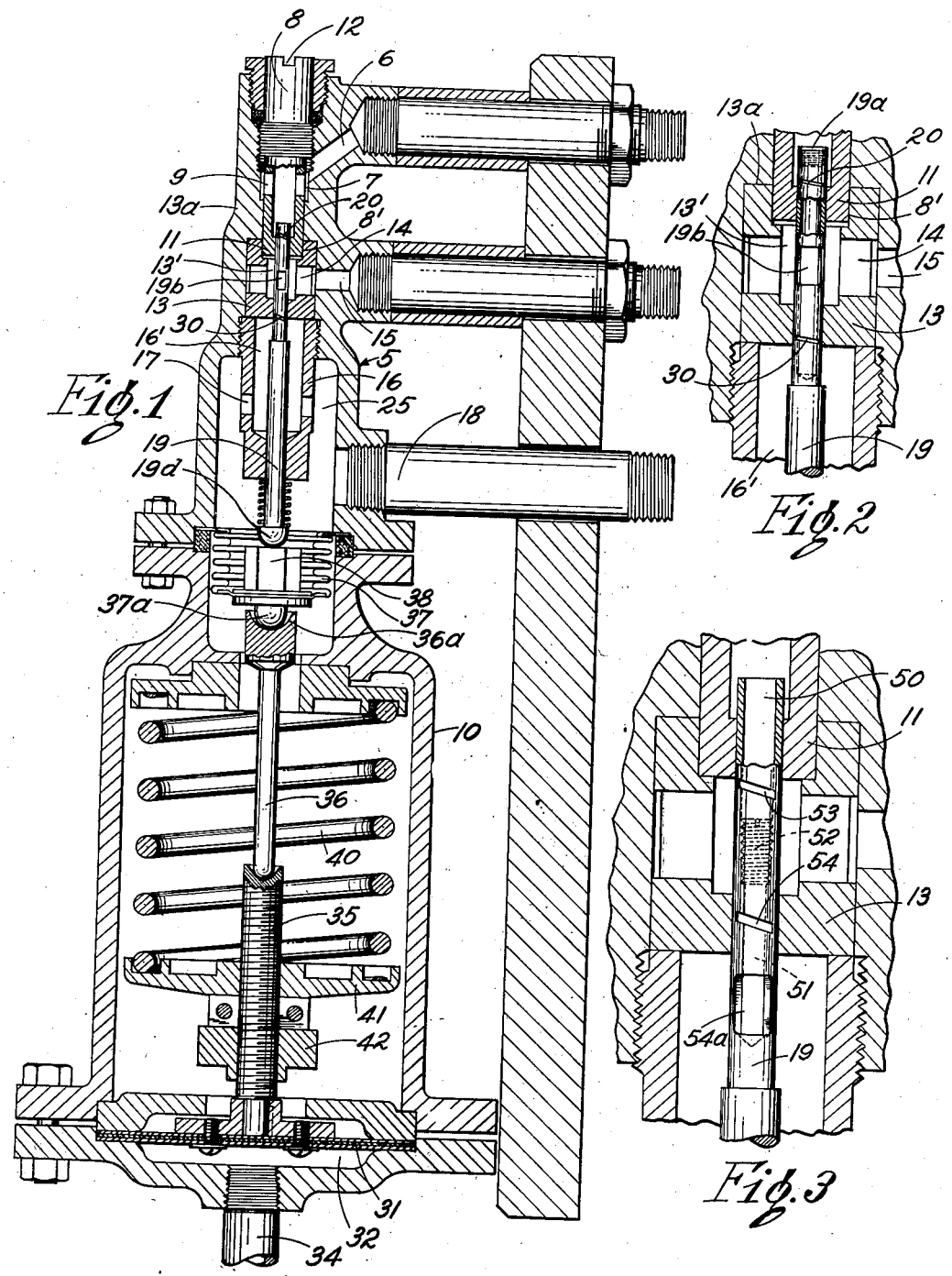

2,256,165

UNITED STATES PATENT OFFICE 2,256,165

PILOT VALVE

Henry J. Mastenbrook, Cleveland, Ohio, assignor to The Swartwout Company, Cleveland, Ohio, a corporation of Ohio Application July 14, 1937, Serial No. 153,580

4 Claims. (Cl. 251—76)

This invention relates to valves and more particularly to improvements in three-way pilot valves of the type shown in my Patent No. 1,923,788, issued August 22, 1933.

It is among the objects of my invention to provide a highly sensitive pilot valve of rugged construction in which delicacy of adjustment and operation can be obtained. It is a further object of my invention to provide a valve which will give a smooth, positive, gradual opening and closing action and a valve disk which will be economical to manufacture and maintain. It is a further object of my invention to provide a valve in which, during at least the latter part of the closing action and at least the beginning of the opening action thereof, the port area changes at a rate which exceeds the rate of movement of the valve. It is a further object of my invention to provide a valve in which, during one portion of the valve movement, the port area varies according to the movement of the valve, and in another portion of the valve movement the port area varies at a rate which exceeds the rate of valve movement. It is a further object of my invention to provide a pilot valve assembly having a pair of valve seats adjustable with respect to each other and a pair of jointly moving valves cooperating with said seats.

A further object of my invention is to provide a pilot valve in which the moving parts are free from restriction or binding action or effect in their operating movement, and in which accurate alignment of many of the moving parts need not be strictly maintained to prevent impairment of the sensitivity of the valve. A further object includes the substantial elimination of friction losses or lags incident to stuffing boxes or packing glands while retaining fluid within the valve body and keeping adequate guiding support for the valve operating rods, stems or other instrumentalities.

Further objects and advantages, including those relating to smoothness of operation and long life, will become apparent from the following description and the drawing wherein:

Figure 1 is a transverse sectional view, with parts broken away, of an illustrative valve constructed according to my invention;

Figure 2 is a partial sectional view on an enlarged scale showing the details of one form of valve ports and seats;

Figure 3 is an enlarged sectional view of an alternative form of valve constructed according to my invention.

In pilot valves of the general type herein described, and as shown in my prior patent, a primary function is to translate or multiply a small force or movement or a small increment of either or both into a greatly augmented force or movement whereby, for example, large instrumentalities such as fluid pressure operated valves may be controlled in response to very small forces or increments which of themselves would be incapable of effecting any substantial change or action in the large valve or instrumentality.

Generally speaking, such a pilot valve operates by controlling two orifices, at opposite sides of an intermediate chamber in the path of fluid tending to flow from a source of high pressure to a place of low pressure, whereby the pressure in the intermediate chamber can be raised to the high pressure or reduced to any value as low as the low pressure by varying the relative and respective sizes of the said orifices. The ease and certainty with which the relative sizes of the orifices can be controlled, and the delicacy with which the ratios of the respective orifice areas can be changed, substantially measures the sensitivity and effectiveness of the pilot valve.

The valve of my invention can be used in a wide range of services and conditions and is readily adaptable to respond to light forces or small increments of change of force from many and varied sources. For example, my pilot valve may be connected to repond to changes in fluid pressures to be controlled and may with equal facility be connected to respond to small mechanical movements and forces such as are derived from thermo-reponsive devices of various sorts. In the drawing I have illustrated my valve in a form adapted to respond to changes in fluid pressure as reflected upon a flexible diaphragm having an operative connection with the valve stem which in its movement varies the respective areas of the controlling orifices or valve ports above referred to.

Referring to the drawing the pilot valve per se, indicated generally at 5, is shown connected with a pressure responsive diaphragm actuated assembly indicated generally at 10. At the upper end of the valve 5 communication is afforded with a conduit 6 which leads to a source of fluid pressure, the flow from which is controlled by the orifices mentioned above. The conduit 6 terminates within the pilot valve body in the high pressure chamber 7 which is sealed at its upper end by an externally threaded valve seat support member 8, which is apertured as at 9 and is provided with a cylindrical valve seat portion 11. The support member 8 is preferably provided with a slot 12 at its upper end to receive a screw driver or similar tool suited to turn the member 8 and effect a raising and lowering of the valve seat portion 11 with respect to the main valve body. As seen in Figs. 2 and 3 the member 8 is in its lowermost position.

A lower valve seat member 13 is arranged within the body 5 and is extended to receive telescopically the lower end of valve seat support 8 as at 8'. The valve seat member 13 embraces the intermediate fluid pressure chamber 13', and is apertured as at 14 so as to communicate with the conduit 15 leading to the fluid pressure responsive instrumentality (not shown), which is ultimately controlled or actuated by the pilot valve. An externally threaded sleeve 16 is disposed in threaded engagement with the valve body beneath the lower valve seat member 13 and is arranged to abut the underside of valve seat member 13 to secure it in position within the pilot valve casing, see also Figs. 2 and 3, by forcing it upwardly against the annular shoulder 13a in the zone of the lower end of the upper seat carrying member 8. The sleeve 16 embraces the low pressure chamber 16' and is apertured as at 17 so as to communicate with the chamber 25 in the lower portion of the valve 5 and thence with the conduit 18 leading to the atmosphere or other pressure less than that existing in conduit 6 and less than that desired in conduit 15.

The two valve seat members 11 and 13 and the sleeve 16 are co-axially bored to slidably receive and guide the tubular valve disk and stem 19 having inclined ports 20 and 30 formed therein. Fluid communication with the ports 20 and 30 is provided by drilling out the upper end of the valve stem 19 as best shown in Figure 2, and closing the upper end of the bore as at 19a. The ports proper are formed by cutting or milling slots in the resulting tube-like strucure, which are preferably inclined, as shown, to give at least an initial rate of opening and closing in excess of the rate of their movement. Said tube-like valve disk is also cut away intermediate the inclined ports 20 and 30 as at 19b to place the ports of the valves 20 and 30 in fluid communication with the intermediate pressure chamber 13' and the middle conduit 15 leading to the said pressure controlled instrumentality (not shown). The combined tubular disk and stem 19 is thus slidably guided at three spaced points, and thus supported for free sliding movement, regardless of such lateral components of actuating force as may be imposed on its head 19d.

The upper cylindrical portion of the stem 19 embracing the ports 19b, 20 and 30 slidably fits in the cylindrical seat portions of the members 11 and 13 and preferably has such a tolerance with respect to the cylindrical wall of the seats that substantially free axial movement is permitted while substantially all fluid flow between the contacting surfaces of stem and seats is prevented; the axial length of the cylindrical seat surfaces contributing both to the restriction of undesired flow between them and the exterior of the stem, and also distributing the mechanical guiding load over relatively great areas.

To insure that the valve stem 19 will not be subjected to any lateral stresses such as might tend to bind the stem I prefer to close the lower end of the pilot valve chamber with a Sylphon bellows 37 carrying a flat topped tappet 38 arranged to bear against the rounded lower end 19d of the stem. In the embodiment of my invention illustrated I have also constructed and arranged the parts acting against the lower side of the Sylphon bellows so that no lateral stresses can be transmitted through the bellows to the stem 19. In installations where the pilot valve is adapted to be controlled by variations in fluid pressure such as illustrated in connection with my preferred embodiment a fluid pressure diaphragm assembly enclosed within a casing 10 may be arranged beneath the pilot valve. The diaphragm assembly includes a flexible fluid pressure responsive diaphragm 31 arranged at the base of the casing 10 and closing one side of a diaphragm pressure chamber 32. The fluid pressure selected to actuate the diaphragm may be led into the chamber 32 through the conduit 34 and the opposed side of the diaphragm is preferably provided with a connecting rod 35 having a rounded socket at its upper end to receive a rounded connecting rod extension 36. The upper end of the connecting rod extension 36 is also preferably provided with re-entrant rounded socket 36a adapted to bear against the rounded projection 37a at the underside of the Sylphon bellows. Opposition to the fluid pressure in the diaphragm chamber 32 is provided by a large coil spring 40 having its upper convolution bearing through a disk against the upper end of the casing 10 and the lower convolution is arranged to bear through a disk 41 and adjusting nut 42 against the diaphragm. Throughout the above described assembly it will be noted that the interfitting rounded joints function to transmit only the vertical component of the diaphragm movement and that the assembly is free of any mechanism which would tend to transmit lateral or bending forces to the valve stem 19.

Referring particularly to the operation of that form of my invention shown in Figure 1 it will be observed that the movement of the valve stem 19 and the valves 20 and 30 carried thereby is determined by the position of the diaphragm 31 and that when the controlling pressure in the chamber 32 acting against the diaphragm overcomes the opposition of the spring 40, the valve stem 19 is pushed upwardly so as to expose the valve 20 above the cylindrical seat 11. This position of the valve 20 will permit the operating fluid pressure to flow down through the internal bore of the valve stem and out through the aperture 19b, thence through the opening 14 and into the conduit 15 which leads to the controlled valve (not shown). The increase in fluid pressure in the conduit 15 and an associated operating diaphragm (not shown) may be utilized to open or close a valve as desired.

The positioning of the valve 20 above the valve seat 11 as above described will effect a closing of the valve 30 by reason of the fact that it moves the valve 30 up within the seat or sleeve 13. This condition of the two valves will be maintained as long as the controlling pressure in the diaphragm chamber 32 is sufficiently high to overcome the reaction of the spring 40. When, however, the controlling pressure is lowered, either by the action of the operating fluid pressure being directed into conduit 15, or by any other action, the spring 40 will through the connector rod assembly and spring 39 effect a lowering of the valve stem. Should the controlling pressure in the chamber 32 drop below a predetermined limit, the valve stem 19 will be lowered to a position whereby the valve 20 is closed and the valve 30 is opened into the sleeve 16 so as to vent the fluid pressure in conduit 15 to atmosphere through openings 17 and conduit 18.

In connection with the effect of the different positions of the valves 20 and 30 with respect to their valve seats, I have provided means to vary the valve timing comprising the adjustable seat 11 carried by seat support member 8. Irrespective of the position of the valve stem 19 which is varied by adjustment of nut 42 or pressures in chamber 32, the time of opening or closing the valve 20 may be controlled by raising or lowering the member 8 through the medium of the external threads thereon. Since according to the preferred embodiment of my invention the spring and connector rod assembly 35—36—40 are under atmospheric pressure, the housing for the assembly 10 may be apertured to render the nut 42 accessible for adjustment, and by means of the nut 42 and the external thread adjustment on valve seat support 8 the desired pilot valve action may be attained.

In practice I have found the action of opening and closing the valves 20 and 30 to be particularly effective for pilot valves in that the angular slots provide a gradual opening and closing action that is desirable in this connection. The valve may be economically constructed in that it involves merely the boring and slotting of the upper end of the valve stem 19. The valve provided by the angular slotting on the bored valve stem is found to be free from defects associated with prior art types of valves used in this connection and to have a long trouble-free life. The method of forming the slots 20 and 30 may also be employed to repair or reshape the valve slots due to wear occasioned by "wire drawing" through the valve.

Referring now to that form of my invention illustrated in Figure 3 it will be noted that the valve stem 19 is provided with a pair of internal bores 50 and 51. These two bores are preferably formed by drilling the upper end of the valve stem and plugging a portion of the drilled out hole as at 52. The valves 53 and 54 co-operate with the valve seats 11 and 13 substantially in the manner described in connection with the description of the species of Figure 1. This form of pilot valve may be arranged within the pilot valve casing 5 and be actuated by the diaphragm 31 in the described manner. During the operation of this form, however, it will be observed that when the controlling pressure within the diaphragm chamber 32 is raised that the valve 53 (which places the operating fluid pressure of conduit 6 in communication with the controlled valve mechanism through conduit 15) will be closed and that the fluid pressure in conduit 15 will be vented to the atmosphere through valve 54, openings 54a—17 and vent conduit 18. Alternatively, when the pressure in the diaphragm chamber 32 is lowered the valve 53 will be returned to the position shown in the Figure 3 by the spring 40.

Upward movement of the stem 19 will tend to increase the intermediate pressure in the conduit 15 in the form shown in Figure 2, but will tend to decrease it in the form shown in Figure 3. In either form the inclined slots coacting with the relatively adjustable cylindrical seats provide a flexible and smooth control, it being understood that both slots may be open at the same time and that the ratio of the respective areas of opening will control the resulting intermediate pressure with great accuracy and will reflect great changes in intermediate pressures in response to small movement of the valve stem 19 in response to very delicate changes in the forces imposed thereon.

The bellows 37 retains fluid within the general confines of the casing 5, and being disposed on the atmospheric side of the valve is subjected only to light hydraulic loads whereby its flexibility may be great, adding to the delicacy and sensitivity of the valve. The upper portion of the stem 19, which is subjected to the high operating pressure, being quite small in the forms shown in Figure 2, receives a small downward pressure tending to hold the lower end of the stem 19 in contact with the tappet 38. When the valve openings, however, are such in either of the forms shown that the resulting downward fluid pressure on the stem 19 is very small, the spring 39 maintains follow-up contact between the head 19d and the tappet 38, this spring being light enough to not substantially interfere with the sensitivity of the apparatus.

While in the foregoing I have illustrated and described certain particular embodiments of my invention, variations and changes thereof will occur to those skilled in the art without departing from the teachings of my invention, and I do not care to be limited to the percise or particular forms herein illustrated and described or in any manner other than by the claims appended hereto when construed to embrace the range of equivalents to which I am entitled in view of the prior art.

I claim:

1. In a pilot valve, a high pressure chamber, an intermediate pressure chamber and a low pressure chamber, axially aligned relatively adjustable cylindrical valve seats dividing said chambers from each other, a cylindrical valve closure member axially movable in said seats having ports adjacent thereto by the movement of which with respect to said seats the pressure of said intermediate chamber is varied, means urging said closure member toward said low pressure chamber, and flexible fluid impervious means closing the side of said low pressure chamber which intersects the axis of said valve seats, said flexible means carrying a rigid part with a flat load bearing surface normal to said axis and movable in the direction of said axis, said valve closure member extending into said low pressure chamber and having a smooth rounded end bearing upon said flattened surface.

2. A pilot valve having high, low and intermediate pressure chambers comprising a body, axially aligned cylindrical valve seats and a ported tubular valve closure member, one of said valve seats comprising an elongated tubular member disposed in said high pressure chamber and closed at the end remote from its seating portion and ported mid-way thereof for fluid communication with said high pressure chamber and having threaded engagement with said valve body whereby the same may be adjusted longitudinally thereof, the other of said valve seats comprising a cylindrical member telescopically receiving said first valve seat member and secured in said valve body in longitudinal alignment with said first named seat and ported for external fluid communication with said intermediate pressure chamber, a tubular guide member having threaded engagement with said valve body and securing said second seat member therein and having a bearing aperture for said valve closure member longitudinally aligned with said valve seats, spring means disposed between said last named member and said valve closure member, said valve closure member comprising a hollow cylindrical portion ported adjacent the ends of said seats whereby axial motion of said member causes one port to open while the other port closes.

3. In a pilot valve, a high pressure chamber, an intermediate pressure chamber and a low pressure chamber, axially aligned cylindrical valve seats dividing said chambers from each other, a hollow cylindrical valve closure member axially movable in said seats having narrow inclined elongated ports adjacent thereto by the movement of which with respect to said seats the pressure of said intermediate chamber is varied, said ports each having an inclined parallelogram peripheral outline and having a length substantially equal to the half of the circumference of said member, one of said ports controlling communication between said high pressure chamber and said intermediate chamber, the other of said ports controlling communication between said intermediate chamber and said low pressure chamber, and means for positioning said closure member to control the pressure in said intermediate pressure chamber.

4. In a pilot valve, a high pressure chamber, an intermediate pressure chamber and a low pressure chamber, axially aligned cylindrical valve seats dividing said chambers from each other, a hollow cylindrical valve closure member axially movable in said seats having narrow inclined elongated ports adjacent thereto by the movement of which with respect to said seats the pressure of said intermediate chamber is varied, said ports each having an inclined parallelogram peripheral outline and having a length substantially equal to the half of the circumference of said member, one of said ports controlling communication between said high pressure chamber and said intermediate chamber, the other of said ports controlling communication between said intermediate chamber and said low pressure chamber, said closure member being closed against fluid communication with said high pressure chamber other than through said port and being additionally ported at said intermediate chamber.

HENRY J. MASTENBROOK.